US010252575B2

(12) United States Patent
Kuwano

(10) Patent No.: US 10,252,575 B2
(45) Date of Patent: Apr. 9, 2019

(54) PNEUMATIC TIRE

(71) Applicant: TOYO TIRE & RUBBER CO., LTD., Osaka-shi, Osaka (JP)

(72) Inventor: Shingo Kuwano, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 141 days.

(21) Appl. No.: 15/351,726

(22) Filed: Nov. 15, 2016

(65) Prior Publication Data

US 2017/0166013 A1 Jun. 15, 2017

(30) Foreign Application Priority Data

Dec. 15, 2015 (JP) ................. 2015-243931

(51) Int. Cl.
*B60C 13/02* (2006.01)
*B60C 11/01* (2006.01)
*B60C 11/13* (2006.01)

(52) U.S. Cl.
CPC .......... *B60C 11/01* (2013.01); *B60C 11/1353* (2013.01); *B60C 13/02* (2013.01); *B60C 2011/1361* (2013.01)

(58) Field of Classification Search
CPC ... B60C 11/01; B60C 2011/013; B60C 13/02; B60C 13/023

USPC .......... 152/209.16, 523; D12/605, 569, 534, D12/506

See application file for complete search history.

(56) References Cited

U.S. PATENT DOCUMENTS

D556,672 S * 12/2007 Umstot ....................... D12/579
2010/0038001 A1 2/2010 Yamaguchi

FOREIGN PATENT DOCUMENTS

JP 5374362 B2 12/2013

* cited by examiner

*Primary Examiner* — Eric Hug
(74) *Attorney, Agent, or Firm* — Westerman, Hattori, Daniels & Adrian, LLP

(57) ABSTRACT

A pneumatic tire includes a first projection formed on a buttress portion, and projecting toward the outside in a tire width direction. The first projection includes a projection body projecting outwardly in the tire width direction from the buttress portion, a first side portion adjacent to the projection body in a tire circumferential direction, and a second side portion adjacent to the first side portion in the tire circumferential direction. The projection body has a main surface extending along the surface of the buttress portion. The first side portion has a first stepped surface positioned away from the main surface toward the inside in the tire width direction by a first distance. The second side portion has a second stepped surface positioned away from the main surface toward the inside in the tire width direction by a second distance which differs from the first distance.

14 Claims, 5 Drawing Sheets

PNEUMATIC TIRE

CROSS-REFERENCE TO RELATED APPLICATIONS

This application claims priority of Japanese Patent Application No.: 2015-243931 filed on Dec. 15, 2015, the content of which is incorporated herein by reference.

BACKGROUND OF THE INVENTION

Technical Field

The present invention relates to a pneumatic tire.

Related Art

Japanese Patent No. 5374362 discloses a pneumatic tire where a plurality of projections is formed on a buttress portion which forms a tread portion side of a side wall portion. The plurality of projections extends toward the inside in a tire radial direction from the tread portion side, projects toward the outside in a tire width direction, and is arranged at intervals in a tire circumferential direction.

SUMMARY

A portion of the buttress portion where the projections are formed has a large rubber volume. Accordingly, compression and strain are repeatedly generated in the portion during the use of the tire so that heat is accumulated in the portion thus giving rise to a possibility that thermal destruction (cracks or breaks) occurs in the projection. In Japanese Patent No. 5374362, heat dissipation property (blow durability) of the projection is enhanced by adjusting an inclination angle between a surface of the buttress portion and a surface of the projection positioned in the tire circumferential direction. However, the projections described in Japanese Patent No. 5374362 have low degree of freedom in design and hence, it is difficult to form a pneumatic tire having favorable design property.

It is an object of the present invention to enhance blow durability of projections and to enhance design property of the pneumatic tire.

An aspect of the present invention provides a pneumatic tire which includes: a side wall portion positioned on an outer edge of the pneumatic tire in a tire width direction, and extending in a tire radial direction; and a first projection formed on a buttress portion of the side wall portion on an outer edge side in the tire radial direction and projecting toward the outside in the tire width direction, wherein the first projection includes: a body projecting toward the outside in the tire width direction from a surface of the buttress portion and having a main surface extending along the surface of the buttress portion; a first side portion disposed adjacently to the body in a tire circumferential direction, and having a first stepped surface which is positioned away from the main surface toward the inside in the tire width direction by a first distance, and a second side portion disposed adjacently to the first side portion in the tire circumferential direction, and having a second stepped surface which is positioned away from the main surface toward the inside in the tire width direction by a second distance which differs from the first distance.

The first projection of the pneumatic tire is formed of three portions which differ from each other in projection amount. Accordingly, a rubber volume of the whole first projection can be reduced while an entire height of the first projection is ensured and hence, it is possible to suppress the accumulation of heat in the first projection during the use of the pneumatic tire. A surface area of the first projection can be increased and hence, heat dissipation property of the first projection can be enhanced. Accordingly, blow durability of the first projection can be enhanced. Further, a shadow is formed around the first projection when light impinges on the first projection, and such a shadow is formed at boundaries between all portions of the first projection. Accordingly, the shadow formed on the first projection can have substantially the same gradation as a shadow formed of a projection having a larger entire height than an actual entire height of the first projection and hence, design property of the pneumatic tire can be enhanced.

The first distance and the second distance are set such that the second stepped surface is positioned between the main surface and the first stepped surface. With such a configuration, the first side portion having the lowest entire height is positioned on a side of the body having the largest entire height, and the second side portion having a larger entire height than the first side portion is positioned on a side of the first side portion. Accordingly, a stepped portion formed on a side of the body can be made large and hence, a dark shadow can be formed. Further, the first side portion is formed into a so-called groove shape where the first side portion is sandwiched between the body and the second side portion having the large entire height. Accordingly, the shadow formed on the first side portion can make the body appear such that the body has an entire height larger than an actual entire height and hence, design property of the pneumatic tire can be further enhanced.

At least a portion of the body is surrounded by the first side portion. The first side portion and the second side portion are arranged in order on both sides of the body in the tire circumferential direction. The first stepped surface and the second stepped surface are positioned away from the surface of the buttress portion toward the outside in the tire width direction. With such configurations, design property of the pneumatic tire can be enhanced with certainty.

A frame portion which projects toward the outside in the tire width direction is formed on an outer peripheral portion of the main surface. With such a configuration, a surface area of the first projection can be further increased and hence, heat dissipation property of the first projection can be enhanced. Further, the shape of the body can be made conspicuous by the frame portion and hence, design property of the pneumatic tire can be further enhanced.

A second projection is formed on the buttress portion such that the second projection is positioned in a spaced apart manner from the first projection in the tire circumferential direction, and the second projection differs from the first projection with respect to at least one of a width which is a size in the tire circumferential direction and a height which is a size in the tire radial direction. With such a configuration, two different kinds of projections are formed on the buttress portion and hence, design property, of the pneumatic tire can be enhanced.

In this case, the second projection has a smaller projection amount which is a size in the tire width direction than the first projection. With such a configuration, with the provision of the second projection having a small projection amount, the first projection having a large projection amount can be made conspicuous and hence, design property of the pneumatic tire can be enhanced with certainty.

According to the present invention, three portions having different projection amounts are formed on the first projection formed on the buttress portion and hence, the accumulation of heat in the first projection can be suppressed, and heat dissipation property of the first projection can be enhanced. Accordingly, blow durability of the first projection can be enhanced. Further, a shadow is formed at boundaries between respective portions of the first projection and hence, design property of the pneumatic tire can be enhanced.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, an embodiment of the present invention is described with reference to drawings.

Figure 1:
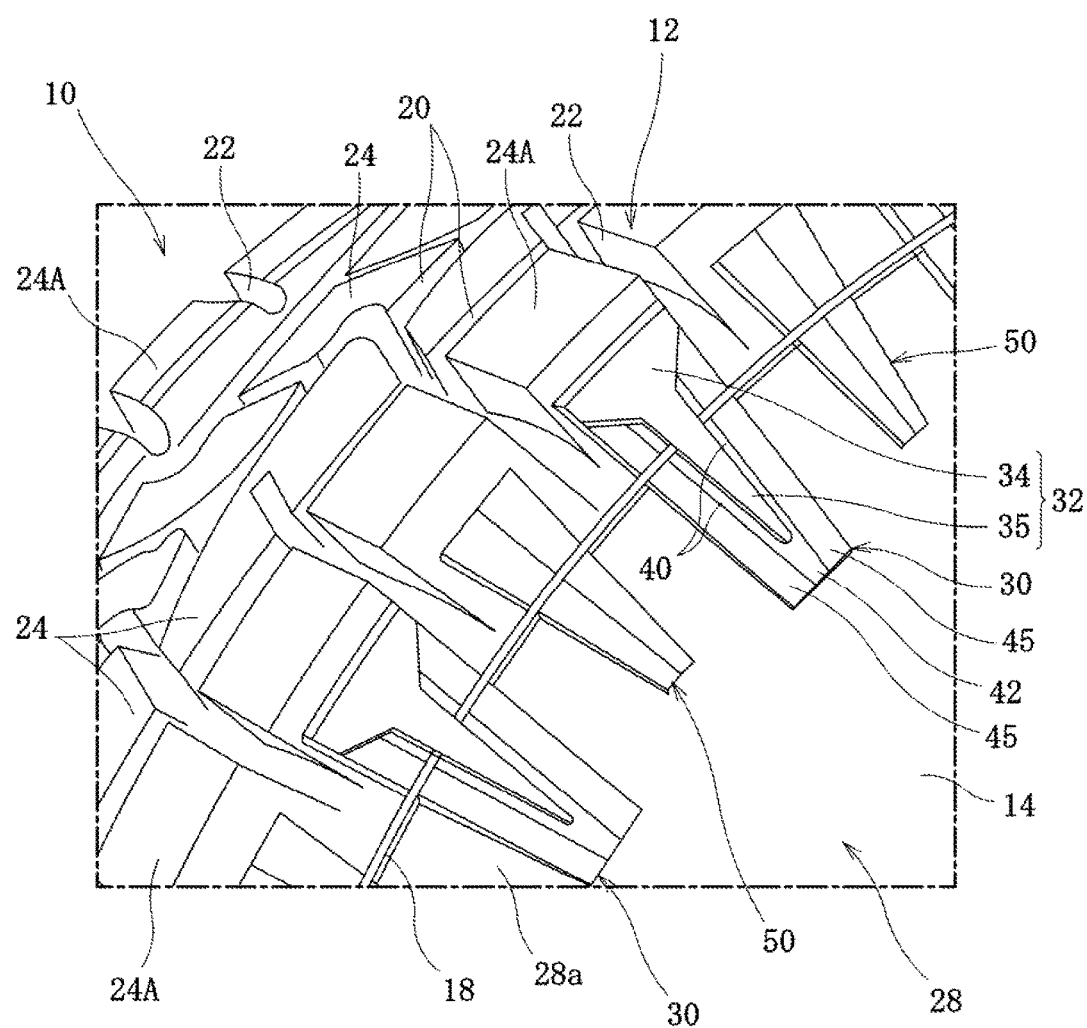
FIG. 1 is a perspective view of a pneumatic tire of an embodiment of the present invention.
Figure 2:
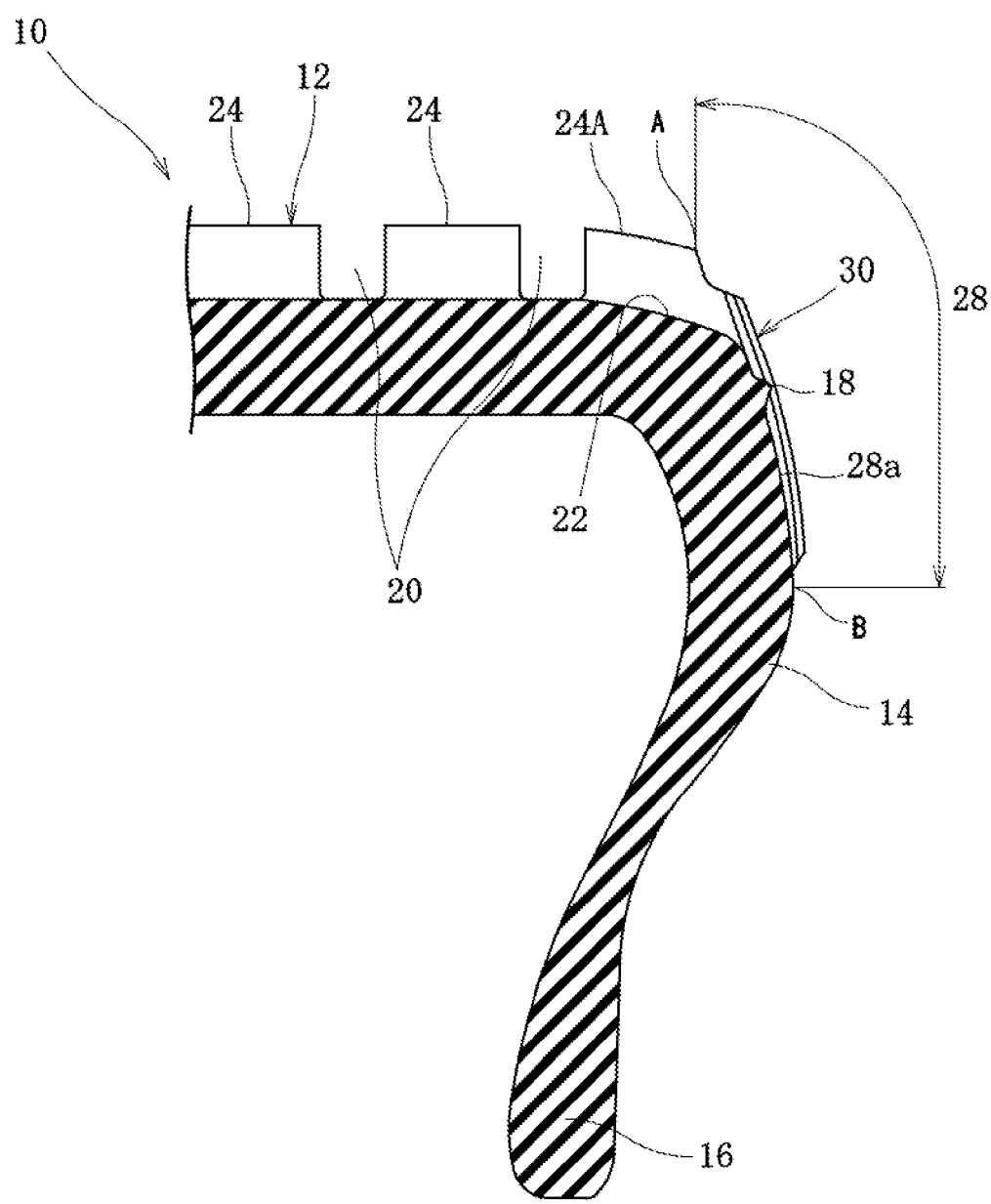
FIG. 2 is a cross-sectional view of the pneumatic tire.

FIG. 1 to FIG. 5 show a pneumatic tire (hereinafter referred to as "tire") 10 according to this embodiment. As shown in FIG. 1 and FIG. 2, the tire 10 includes a tread portion 12 having a predetermined tread pattern. Side wall portions 14, 14 extending toward the inside in a tire radial direction are formed on both outer edges of the tread portion 12 in a tire width direction respectively. A bead portion 16 which is disposed in a tire wheel is formed on an inner edge of each side wall portion 14 in the tire radial direction. An annular rib 18 projecting outward in the tire width direction is formed at a boundary portion between the tread portion 12 and the side wall portion 14. A belt, a carcass, and head wires which are not shown in the drawings are embedded in rubber which forms the tire 10.

A plurality of main grooves 20 extending in a tire circumferential direction and a plurality of lateral grooves 22 extending in the tire width direction are formed on the tread portion 12. A plurality of blocks 24 is defined by the main grooves 20 and the lateral grooves 22 on the tread portion 12. A plurality of sipes 26 extending in the tire width direction is formed on these blocks 24 (see FIG. 3). In the description made hereinafter, each of blocks 24A positioned at outer edges of the tread portion 12 in the tire width direction is referred to "shoulder block". A portion of each side wall portion 14 on an outer edge side in the tire radial direction, more specifically, a region of each side wall portion 14 ranging from a ground contact edge A of the shoulder block 24A to a position B of the side wall portions 14 having a largest width in the tire width direction is referred to as "buttress portion 28".

Figure 3:
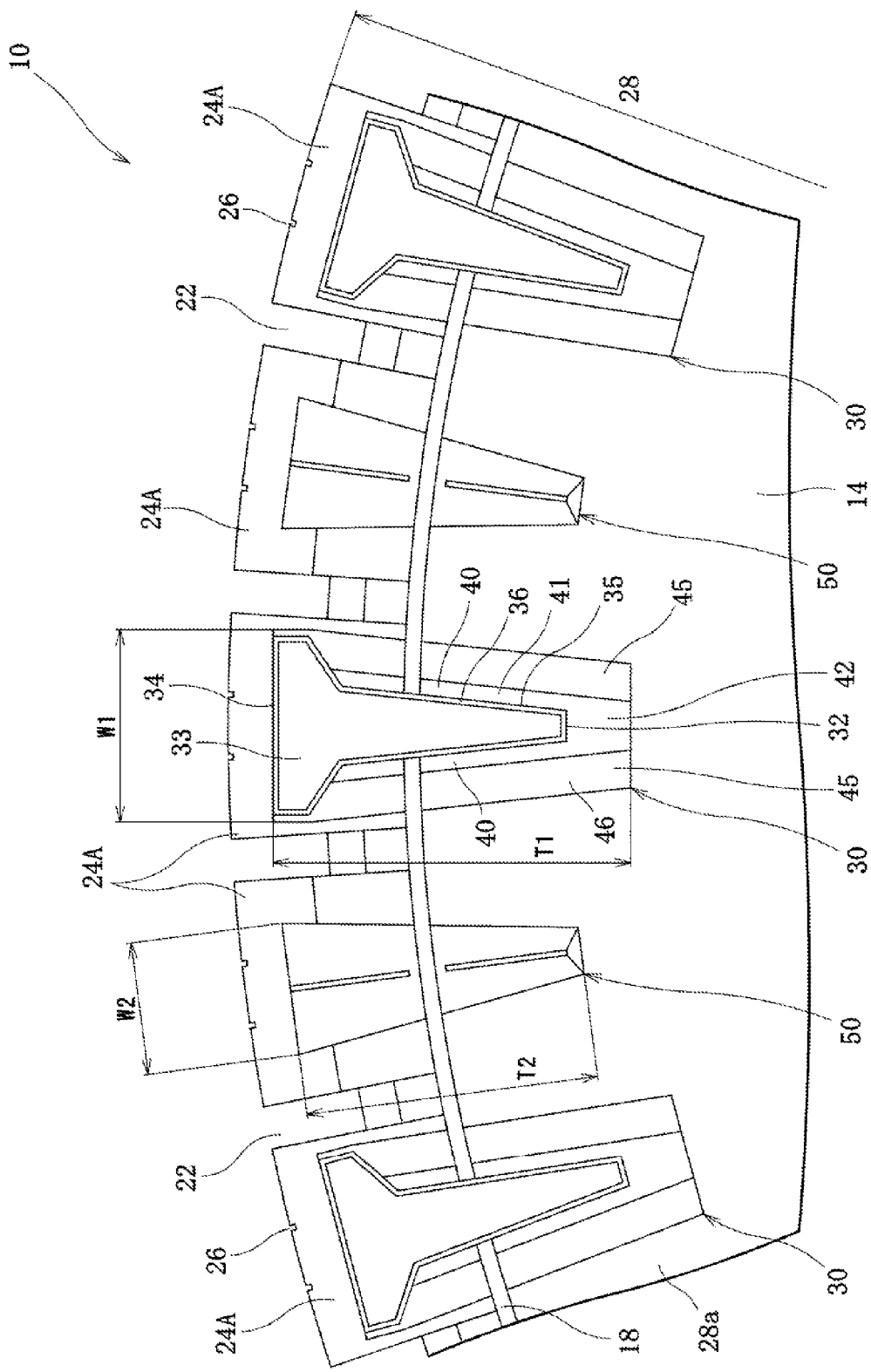
FIG. 3 is a side view of the pneumatic tire.

Also with reference to FIG. 3, two kinds of projections 30, 50 which project outward in the tire width direction from a surface (reference surface) 28a are alternately formed on the buttress portion 28 at intervals in the tire circumferential direction. These projections 30, 50 are formed so as to extend toward the inside in the tire radial direction from outer end surfaces of the shoulder blocks 24A. The projections 30, 50 have a function of complementing rigidity of the shoulder blocks 24A and rigidity of the side wall portions 14, and a function of generating a traction of the tire by being in contact with obstacles such as rocks when a vehicle travels off-road.

The first projections 30 and the second projections 50 are formed having different widths W1, W2 which are sizes in the tire circumferential direction, respectively. Further, the first projections 30 and the second projections 50 are formed having different heights T1, T2 which are sizes in the tire radial direction, respectively. Also with reference to FIG. 4 and FIG. 5, the first projections 30 and the second projections 50 are formed having different, projection amounts P1, P2 which are sizes in the tire width direction, respectively.

(Detail of First Projections)

Figure 4:
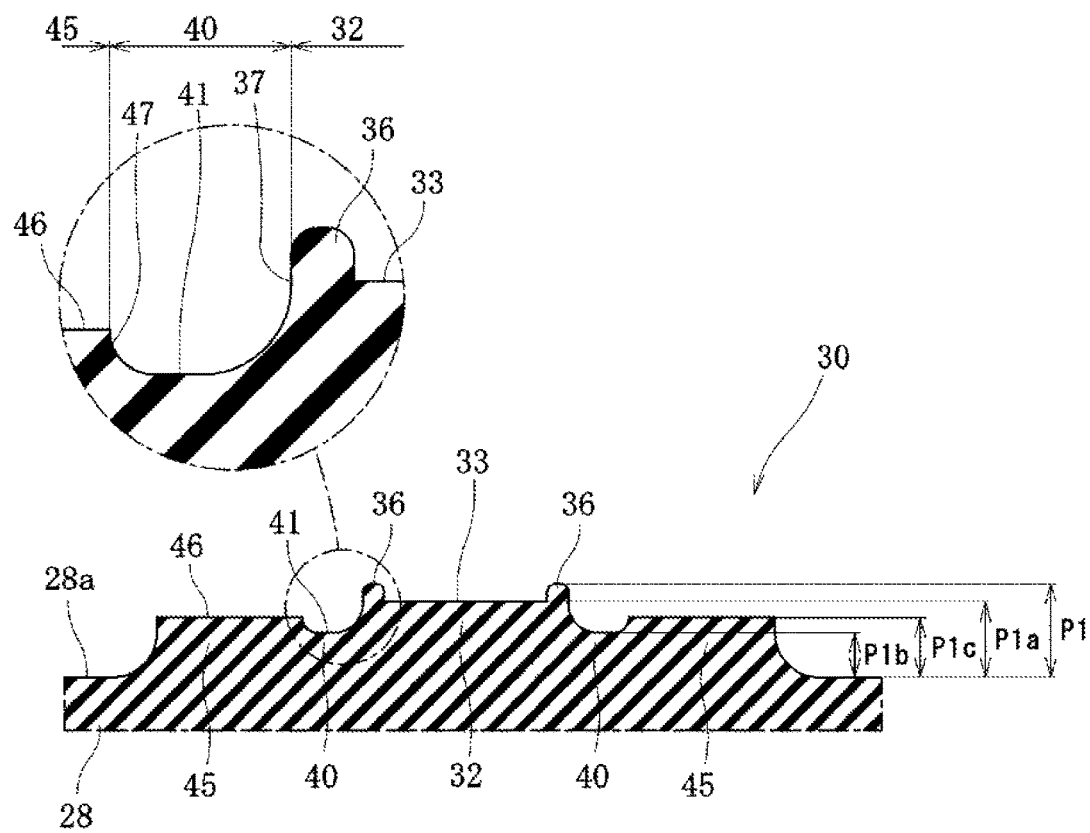
FIG. 4 is a cross-sectional view of a first projection.

As shown in FIG. 3 and FIG. 4, each first projection 30 is formed such that a projection body 32 having an approximately T shape is disposed at the center of the first projection 30, and a first side portion 40 and a second side portion 45 are adjacently disposed on both sides of the projection body 32 in the tire circumferential direction respectively in this order. In this embodiment, the first side portions 40, 40 are disposed so as to surround a portion of the projection body 32 on the inner side in the tire radial direction, and the second side portions 45, 45 are disposed on outer sides of these first side portions 40, 40 in the tire circumferential direction respectively.

The projection body 32 has a main surface 33 which is positioned away from a surface 28a of the buttress portion 28 toward the outside in the tire width direction by a distance P1a. Each of the first side portions 40 has a first stepped surface 41 which is positioned away from the surface 28a of the buttress portion 28 toward the outside in the tire width direction by a distance P1b. Each of the second side portions 45 has a second stepped surface 46 which is positioned away from the surface 28a of the buttress portion 28 toward the outside in the tire width direction by a distance P1c which is different from the distance Fib of the first stepped surface 41. The respective surfaces 33, 41, 46 extend along the surface 28a of the buttress portion 28.

The first stepped surface 41 is positioned away from the main surface 33 toward the inside in the tire width direction by a first distance P1a-P1b. The second stepped surface 46 is positioned away from the main surface 33 toward the inside in the tire width direction by a second distance P1a-P1c. The second distance P1a-P1c is set smaller than the first distance P1a-P1b so as to make the second stepped surface 46 positioned between the main surface 33 and the first stepped surface 41. That is, in the first projection 30, the projection body 32 having the largest entire height and the first side portions 40 each having the smallest entire height are disposed adjacently to each other in the tire circumferential direction.

More specifically, the projection body 32 is a designed protrusion having an approximately T shape, and is formed of a head portion 34 and an extending portion 35. The head portion 34 has an approximately inverted trapezoidal shape which extends in the tire circumferential direction, and is formed on an outer end surface of the shoulder block 24A. The extending portion 35 is formed into a trapezoidal shape whose lateral width is gradually narrowed toward the inside in the tire radial direction from the head portion 34. A frame portion 36 (saw-cut stepped portion) which projects outward in the tire width direction is further formed on an outer peripheral portion of the main surface 33. The frame portion 36 is a projection ridge which projects so as to surround an outer peripheral portion of the main surface 33.

The first side portions 40 extend over an inner end of the extending portion 35 in the tire radial direction from the head portion 34. Each first side portion 40 has a groove shape, and is defined by an outer side wall 37 positioned on an outer side of the projection body 32 in the tire circumferential direction, an inner side wall 47 positioned of the second side portion 45 on an inner side in the tire circumferential direction, and the first stepped surface 41. The outer side wall 37 and the inner side wall 47 extend approximately parallel to each other. The pair of first side portions 40, 40 which is positioned on both sides of the projection body 32 is connected to each other by a connecting portion 42 disposed on the inner side of the extending portion 35 in the tire radial direction. The connecting portion 42 is defined by inner side walls 47, 47 of the pair of the second side portions 45, 45 and the first stepped surfaces 41. An outer peripheral portion of the projection body 32 is surrounded in an approximately U shape by the pair of first side portions 40, 40 and the connecting portion 42.

In the same manner as the first side portions 40, the second side portions 45 extend over the inner end of the extending portion 35 in the tire radial direction from the head portion 34. More specifically, each second side portion 45 is disposed such that the second side portion 45 extends to a position substantially equal to an inner end of the connecting portion 42 in the tire radial direction from a position substantially equal to an outer end of the projection body 32 in the tire radial direction. A width of the second side portion 45 in the tire circumferential direction is set larger than a width of the first side portion 40 in the tire circumferential direction.

The distance P1$a$ which corresponds to an amount that the projection body 32 projects from the surface 28$a$ is set to a value which falls within a range from 2 mm to 5 mm inclusive, and is preferably set to a value which falls within a range from 3 mm to 4 mm inclusive. This is because when the distance P1$a$ of the projection body 32 is set larger than 5 mm, a wall thickness of the projection body 32 becomes large and hence, there is a possibility that heat is accumulated in the projection body 32 during the use of the pneumatic tire thus causing thermal destruction in the projection body 32. Further, when the distance P1$a$ of the projection body 32 is set to 5 mm or more, the first projection 30 can sufficiently ensure favorable appearance in design even when the first side portions 40 or the second side portions 45 are not formed. On the other hand, when the distance P1$a$ of the projection body 32 is set lower than 2 mm, a wall thickness of the first projection 30 becomes excessively small and hence, rigidity of the side wall portions 14 and rigidity of the shoulder blocks 24A cannot be sufficiently complemented whereby the first projection 30 exhibits poor appearance in design.

It cannot be said that the projection body 32 formed with such a height always provides the projection body 32 with favorable appearance in design when only the projection body 32 is formed. In view of the above, in this embodiment, the distance P1-P1$a$ which corresponds to a projection amount of the frame portion 36 formed on the projection body 32 is set to a value which falls within a range from 0.5 mm to 1.5 mm inclusive, and is preferably set to 1.0 mm. The projection body 32 on which the frame portion 36 is formed can make a shape (edge) of the projection body 32 conspicuous and hence, the appearance of the projection body 32 (first projection 30) can be enhanced.

Figure 6:
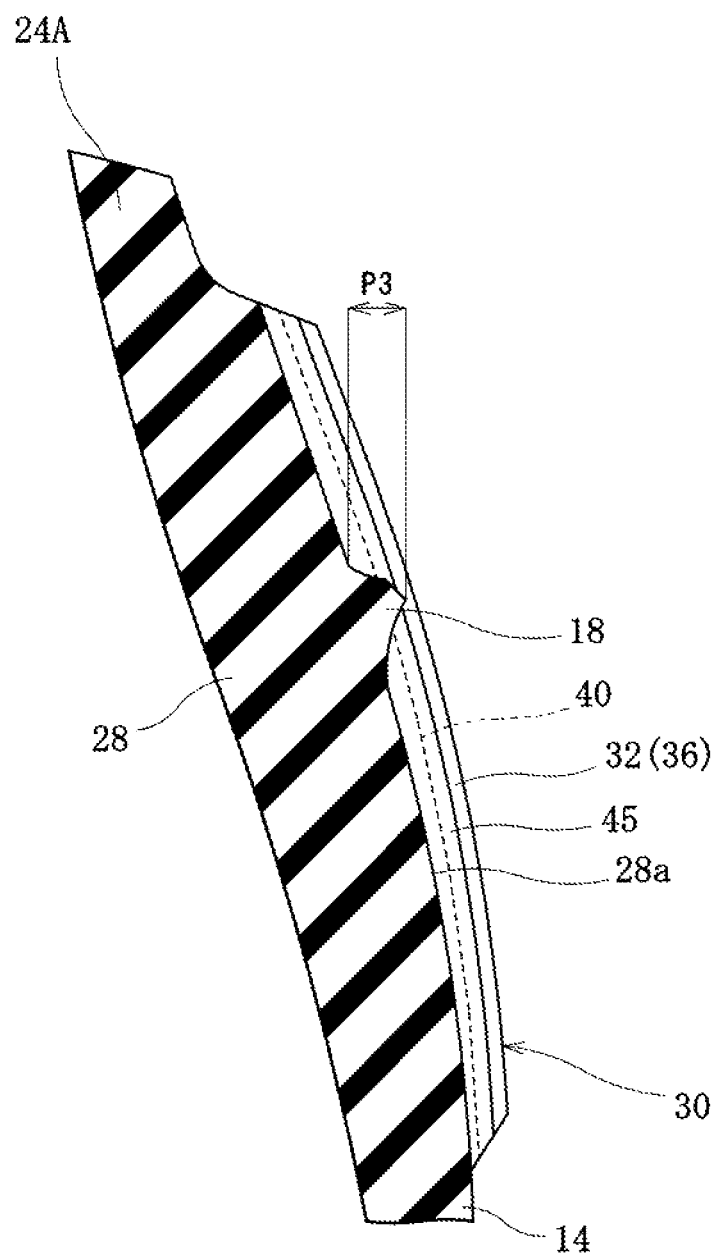
FIG. 6 is a partial enlarged cross-sectional view of FIG. 2.

The distance P1$b$ which corresponds to a projection amount of the first side portions 40 disposed adjacent to the projection body 32 from the surface 28$a$ is set to a value which falls within a range from 0.5 mm to 3.5 mm inclusive, and is preferably set to a value which falls within a range from 1 mm to 3 mm inclusive. By setting the projection amount of the first side portion 40 as described above, an entire height of the outer side wall 37 of the projection body 32 (a difference between the main surface 33 and the first stepped surface 41) can be set to 6 mm at maximum. The distance P1$c$ which corresponds to a projection amount of the second side portion 45 from the surface 28$a$ is set to an approximately intermediate value between a numerical value which falls within a range of the distance P1$a$ and a numerical value which falls within a range of the distance P1$b$. As shown in FIG. 6, to compare the distance P1$a$ of the projection body 32 with a projection amount P3 that the annular rib 18 formed on the buttress portion 28 projects from the surface 28$a$, the distance P1$a$ of the projection body 32 is equal to or larger than the projection amount P3, and the distances P1$b$, P1$c$ of the first side portion 40 and the second side portion 45 are larger than the projection amount P3.

As described above, three portions 32, 40, 45 having different projection amounts are formed on the first projection 30 and hence, shadows are formed at boundaries of these portions when light impinges on the first projection 30. Further, the first side portions 40 each having the smallest entire height are positioned on the sides of the projection body 32 having the largest entire height and hence, it is possible to form a large stepped portion between the projection body 32 and each first side portion 40 formed on a side of the projection body 32. The first side portion 40 is formed into a groove shape sandwiched between the projection body 32 and the second side portion 45. Accordingly, on the side of the projection body 32, it is possible to form a shadow formed by the projection body 32 per se and a shadow darker than a shadow formed on a groove which is the first side portion 40. As a result, it is possible to make the projection body 32 appear such that the projection body 32 has an entire height larger than an actual entire height and hence, design property of the tire 10 can be further enhanced. In other words, it is unnecessary to excessively increase the projection amount of the first projection 30 (projection body 32) for enhancing design property (appearance).

In addition to the above, due to the formation of three portions 32, 40, 45, a rubber volume of the whole first projection 30 can be reduced while the entire height (P1$a$) of the first projection 30 is ensured. Accordingly, the accumulation of heat in the first projections 30 can be suppressed at the time of using the tire and, further, heat dissipation property can be enhanced by increasing a surface area of each first projection 30. The frame portion 36 is formed on the outer peripheral portion of the projection body 32 so that the surface area of the first projection 30 can be further increased due to the formation of the frame portion 36 whereby heat dissipation property of each first projection 30 can be further enhanced. As a result, blow durability of the first projection 30 can be enhanced and hence, it is possible to prevent the occurrence of thermal destruction in the first projection 30.

(Detail of Second Projections)

Figure 5:
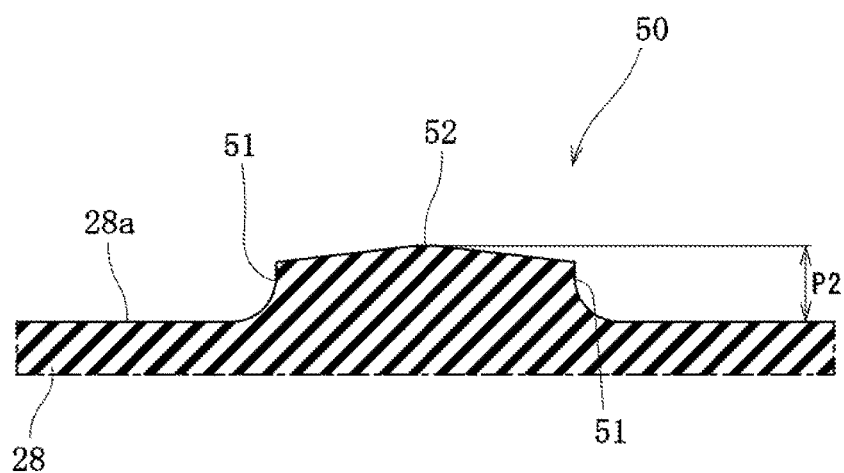
FIG. 5 is a cross-sectional view of a second projection.

As shown in FIG. 3 and FIG. 5, the second projections 50 are formed such that each second projection 50 extends toward the inside in the tire radial direction on the shoulder block 24A which is disposed adjacent to the shoulder block 24A on which the first projection 30 is formed in the tire circumferential direction. The second projection 50 is formed into a trapezoidal shape whose lateral width in the tire circumferential direction is gradually narrowed toward the inside in the tire radial direction from an outer end of the second projection 50 in the tire radial direction. The second projection 50 is formed in an approximately triangular cross-sectional shape such that the second projection 50 projects in the tire width direction toward a top portion 52 at the center of the second projection 50 in the tire circumferential direction from both side edge portions 51, 51 disposed on both sides of the second projection 50 in the tire circumferential direction.

Also with reference to FIG. 4 and FIG. 6, a projection amount P2 where the top portion 52 of the second projection 50 projects in the tire width direction from the surface 28a is set smaller than the projection amount P1a of the projection body 32 and is set smaller than a projection amount P3 of the annular rib 18. The projection amount P2 of the top portion 52 in this embodiment is set substantially equal to the projection amount P1c of the second side portion 45. A maximum width W2 of the second projection 50 in the tire circumferential direction is set narrower than a maximum width W1 of the first projection 30. A height T2 of the second projection 50 in the tire radial direction is set smaller than a height T1 of the first projection 30.

As described above, two kinds of projections 30, 50 having different lateral widths W1, W2 and different entire heights T1, T2 are formed on the buttress portion 28 and hence, design property of the tire 10 can be enhanced. Further, three portions 32, 40, 45 having different entire heights P1a to P1c are formed on each first projection 30 having the larger lateral width W1 and the larger entire height T1. Accordingly, due to the formation of the second projections 50 having a simple shape, it is possible to make the first projections 30 having a complicated shape and forming gradation in a shadow conspicuous. As a result, design property of the tire 10 can be enhanced with certainty while blow durability is enhanced. Further, the respective projections 30, 50 effectively contribute to the enhancement of traction performance of the tire 10. Further, the respective projections 30, 50 can complement rigidity of portions of the tire 10 which are largely deflected or deformed, for example, a portion of the side wall portion 14 having a largest width and the shoulder blocks 24A.

The pneumatic tire 10 of the present invention is not limited to the configuration of the embodiment, and various modifications are conceivable.

For example, the projections 30, 50 may be formed such that the projections 30, 50 extend toward the inside in the tire radial direction from the annular rib 18 for complementing rigidity of the side wall portion 14 where a deflection amount of the tire 10 is the largest. The first stepped surface 41 of the first side portion 40 may be positioned inside the surface 28a of the buttress portion 28 in the tire width direction so as to make the projection body 32 further conspicuous. Although two kinds of projections 30, 50 are formed on the buttress portion 28 in the embodiment, only the first projections 30 may be formed on the buttress portion 28, or three or more kinds of projections may be formed on the buttress portion 28. Although the first projections 30 and the second projections 50 differ from each other in both width in the tire circumferential direction and height in the tire radial direction, the first projections 30 and the second projections 50 may differ from each other in either one of width in the tire circumferential direction and height in the tire radial direction.

Although the first side portions 40 each having the smallest projection amount P1b are disposed on sides of the projection body 32 having the largest projection amount P1a in this embodiment, the projection amount P1c of the second side portion 45 may be set smaller than the projection amount P1b of the first side portion 40. Further, although the first side portion 40 and the second side portion 45 are disposed on each of both sides of the projection body 32 in the tire circumferential direction in the embodiment, the first side portion 40 and the second side portion 45 may be disposed only on one of both sides of the projection body 32 in the tire circumferential direction.

What is claimed is:

1. A pneumatic tire comprising:
    a side wall portion positioned on an outer edge of the pneumatic tire in a tire width direction, and extending in a tire radial direction; and
    a first projection formed on a buttress portion of the side wall portion on an outer edge side in the tire radial direction and projecting toward the outside in the tire width direction,
    wherein the first projection includes:
    a body projecting toward the outside in the tire width direction from a surface of the buttress portion and having a main surface extending along the surface of the buttress portion;
    a first side portion disposed adjacently to the body in a tire circumferential direction, and having a first stepped surface which is positioned away from the main surface toward the inside in the tire width direction by a first distance; and
    a second side portion disposed adjacently to the first side portion in the tire circumferential direction, and having a second stepped surface which is positioned away from the main surface toward the inside in the tire width direction by a second distance which differs from the first distance, and
    wherein the first distance and the second distance are set such that the second stepped surface is positioned between the main surface and the first stepped surface.

2. The pneumatic tire according to claim 1, wherein at least a portion of the body is surrounded by the first side portion.

3. The pneumatic tire according to claim 1, wherein the first side portion and the second side portion are arranged in order on both sides of the body in the tire circumferential direction.

4. The pneumatic tire according to claim 1, wherein the first stepped surface and the second stepped surface are positioned away from the surface of the buttress portion toward the outside in the tire width direction.

5. The pneumatic tire according to claim 1, wherein a frame portion which projects toward the outside in the tire width direction is formed on an outer peripheral portion of the main surface.

6. The pneumatic tire according to claim 1, wherein a second projection is formed on the buttress portion such that the second projection is positioned in a spaced apart manner from the first projection in the tire circumferential direction, and the second projection differs from the first projection with respect to at least one of a width which is a size in the tire circumferential direction and a height which is a size in the tire radial direction.

7. The pneumatic tire according to claim 6, wherein the second projection has a smaller projection amount which is a size in the tire width direction than the first projection.

8. A pneumatic tire comprising:
    a side wall portion positioned on an outer edge of the pneumatic tire in a tire width direction, and extending in a tire radial direction; and a first projection formed on a buttress portion of the side wall portion on an outer edge side in the tire radial direction and projecting toward the outside in the tire width direction, wherein the first projection includes:

a body projecting toward the outside in the tire width direction from a surface of the buttress portion and having a main surface extending along the surface of the buttress portion;

a first side portion disposed adjacently to the body in a tire circumferential direction, and having a first stepped surface which is positioned away from the main surface toward the inside in the tire width direction by a first distance; and a second side portion disposed adjacently to the first side portion in the tire circumferential direction, and having a second stepped surface which is positioned away from the main surface toward the inside in the tire width direction by a second distance which differs from the first distance, and wherein a frame portion which projects toward the outside in the tire width direction is formed on an outer peripheral portion of the main surface.

9. The pneumatic tire according to claim 8, wherein the first distance and the second distance are set such that the second stepped surface is positioned between the main surface and the first stepped surface.

10. The pneumatic tire according to claim 8, wherein at least a portion of the body is surrounded by the first side portion.

11. The pneumatic tire according to claim 8, wherein the first side portion and the second side portion are arranged in order on both sides of the body in the tire circumferential direction.

12. The pneumatic tire according to claim 8, wherein the first stepped surface and the second stepped surface are positioned away from the surface of the buttress portion toward the outside in the tire width direction.

13. The pneumatic tire according to claim 8, wherein a second projection is formed on the buttress portion such that the second projection is positioned in a spaced apart manner from the first projection in the tire circumferential direction, and the second projection differs from the first projection with respect to at least one of a width which is a size in the tire circumferential direction and a height which is a size in the tire radial direction.

14. The pneumatic tire according to claim 13, wherein the second projection has a smaller projection amount which is a size in the tire width direction than the first projection.

* * * * *